United States Patent [19]

Valone et al.

[11] Patent Number: 4,499,006

[45] Date of Patent: Feb. 12, 1985

[54] CORROSION INHIBITORS

[76] Inventors: Frederick W. Valone; Joseph Rutledge, both of Houston, Tex.

[21] Appl. No.: 501,674

[22] Filed: Jun. 6, 1983

[51] Int. Cl.³ ............................................. C23F 11/00
[52] U.S. Cl. ............................. 252/392; 252/8.55 E; 422/12
[58] Field of Search ......................... 252/8.55 E, 392; 422/16, 12

[56] References Cited

U.S. PATENT DOCUMENTS

| 3,712,862 | 1/1973 | Bundrant | 252/392 |
| 3,712,863 | 1/1973 | Bundrant | 252/8.55 E |
| 4,107,061 | 8/1978 | Sturwold et al. | 252/392 |
| 4,185,071 | 1/1980 | Sujdak | 252/392 |
| 4,250,042 | 2/1981 | Higgins | 252/8.55 R |
| 4,387,042 | 6/1983 | Hort et al. | 252/392 |
| 4,420,414 | 12/1983 | Valone | 252/392 |

Primary Examiner—Paul Lieberman
Assistant Examiner—Willie Thompson
Attorney, Agent, or Firm—Jack H. Park; Kenneth R. Priem; Richard A. Morgan

[57] ABSTRACT

A series of novel water-dispersible corrosion inhibiting solutions are disclosed which contain a composition which includes the reaction product of an amine mixture and an organic monomer acid mixture. A process for the inhibition of corrosion in aqueous environment is also disclosed. The process is particularly useful for protecting metal surfaces in subterranean petroleum pumping wells.

18 Claims, No Drawings

CORROSION INHIBITORS

BACKGROUND OF THE INVENTION

1. Field of the Invention

This invention relates to water soluble corrosion inhibitor solutions. The invention also relates to a process for protecting metal from corrosion, particularly in the harsh aqueous and $H_2S$ environment found in subterranean wells such as during petroleum production. More particularly, the invention relates to water soluble corrosion inhibitor compositions formed by reacting an amine mixture with an acid mixture (including petroleum wax oxidate) to form amides.

2. Prior Art

It is well known in the art to protect metal surfaces in subterranean well bores with corrosion inhibitors which include carboxylic acids and ammonia compounds. U.S. Pat. Nos. 3,712,862 and 3,712,863, Bundrant et al., describe the reaction of monomeric acids with petroleum wax oxidate to form either an amide or an imidazoline which is not water soluble (less than 250 ppm), but is oil soluble or dispersible. These inhibitors fall through the oil layer in the well bore and into the aqueous phase at the bottom of the well. A weighting agent is released and the inhibitor rises to the oil-water interface. Because of the nature of the inhibitor fluid, batch treatment is administered which requires the well be shut in for 24 to 48 hours to allow the inhibitor to separate from the weighting material. Solutions of the present invention have different properties from those of Bundrant et al. One manifestation of this difference is the difference in application for corrosion inhibition as is described herein.

SUMMARY OF THE INVENTION

The present invention relates to corrosion inhibitor solutions comprising water and/or brine and a composition, which is the reaction product of (1) an amine mixture comprising a poly(oxypropylene)diamine and a poly(oxypropylene)triamine or alkyl propylene diamine and (2) an organic monomer acid mixture comprising a petroleum wax oxidate and a fatty acid. When the amine mixture comprises an alkyl propylene diamine, the composition is neutralized with another organic acid.

DESCRIPTION OF THE PREFERRED EMBODIMENTS

The present invention provides a novel corrosion inhibition solution comprising:
A. water and/or brine, and
B. 10 ppm to 1,000 ppm and preferably 25 ppm to 250 ppm of a composition comprising:
  1. an amine mixture comprising: a 0.8:1 to 1:0.8 mixture of a poly(oxyethylene)diamine of molecular weight from 500 to 700 and a poly(oxypropylene)-triamine of molecular weight from 300 to 500, and
  2. an organic monomer acid mixture comprising: a 0.8:1 to 1:0.8 mixture of a petroleum wax oxidate and a fatty acid.

The amine mixture comprises poly(oxyethylene)diamine and poly(oxypropylene)triamine. A preferred pair of diamine and triamine has been found. The preferred poly(oxyethylene)diamines in the solution of the present invention are water soluble aliphatic primary diamines structurally derived from propylene oxide-capped polyethylene glycol. The group of poly(oxyethylene)diamines is expressed by the general formula:

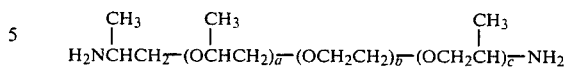

wherein b averages 13.5 and a+c averages 3.5. These diamines are liquid at room temperature and have a viscosity of 72 cs at 20° C.; 20 cs at 50° C. and 6.7 cs at 210° F. They have a flash point of 495° F. (257° C.) and a pour point of 20° F. (−6.7° C.).

A preferred poly(oxypropylene)triamine in the diamine-triamine pair in the solution of the present invention is a trifunctional primary amine of the general formula:

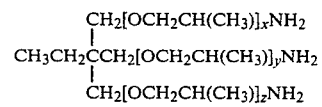

wherein x+y+z averages 5.3. These triamines are liquid at room temperature and have a viscosity of 76.5 cs at 25° C. and 97 cs at 20° C. They are available commercially.

The proportionate amounts of polyoxyethylene and polyoxypropylene impart a water solubility that enhances the corrosion inhibition characteristics of the solutions of the present invention. The unique combination of diamines and triamines imparts a viscosity to solutions of the present invention which make them convenient to handle, yet produces a non-persistent corrosion inhibiting film on metal surfaces.

In the alternative, the amine mixture comprises: a 0.8:1 to 1:0.8 mixture of a poly(oxyethylene)diamine of molecular weight from 500 to 700 and an alkyl propylene diamine selected from the group consisting of:
N-coco-1,3-diaminopropane,
N-soya-1,3-diaminopropane,
N-tallow-1,3-diaminopropane, and
N-oleyl-1,3-diaminopropane.

As mentioned, the poly(oxyethylene)diamine is of the general formula:

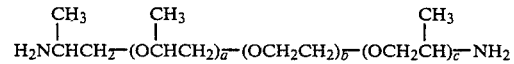

wherein b averages 13.5 and a+c averages 3.5.

Solutions made from this amine pair are reacted with an organic monomer acid mixture in composition and quantity as herein defined. After reaction, solutions comprising this amine pair may be neutralized with another organic acid to adjust water solubility by techniques well known in the art (Surfactants For The Chemical Industry, Witco Chemical Company, Organics Div. Bulletin 250 September 1978, page 28).

The organic monomer acid mixture comprises petroleum wax oxidate and fatty acid. Petroleum wax oxidate is the product of petroleum derived paraffin wax which has been oxidized. The oxidized paraffin is essentially a mixture of paraffin based carboxylic acids and esters in the range of $C_4$ to $C_{25}$ preferably $C_{10}$ to $C_{20}$. By the nature of the process for oxidizing paraffins, the petroleum wax oxidate can include major amounts of alcohols, ketones, hydroxy and keto acids, estolides, lactides and lactones. And typically these petroleum wax oxidate products contain about 25% acid and ester.

A commercially available petroleum wax oxidate, Texaco TX3650, is used in the Examples. A typical analysis of this petroleum wax oxidate is:

| Neutralization No. | 225 |
| --- | --- |
| Saponification No. | 420 |
| Density, lb./gal @ 60° F. | 9.0 |
| Melting Point, °F. | 70 |
| Viscosity @ 210° F. sus | 160 |
| Flash Point, °F. | 445 |
| Dibasic Acid Wt. % | 12 |
| Molecular Wt. (approx.) | 400 |
| Unsaponifiables, Wt. % | 6 |

Fatty acids are carboxylic acids derived from animal or vegetable fats and oils. Fatty acids of the solution of the present invention are preferably $C_{16}$ to $C_{18}$ monomer fatty acids or mixtures thereof. Fatty acids may be saturated or unsaturated and usually contain an even number of carbon atoms. Additionally, surfactants can be added to the solutions to enhance surface activity. These surfactants are typically used at concentrations of 1 wt% to 4 wt% in the inhibitor formulation. Surfactants may include ethoxylated alcohols, sulfonates, ethoxylated ethers, etc., e.g. Witco LA-230, Texaco Surfonic N series, Texaco DCPDS.

In making the solutions of the present invention the amine mixture and organic monomer acid mixture are reacted to form an amide. In a preferred embodiment the amine mixture is from 40% to 60% in molar excess of the monomer acid mixture. This excess amine imparts a basicity to the solution which enhances the corrosion inhibition characteristic.

When the reaction is carried out at a temperature of approximately 160° C. the characteristic amide formed is:

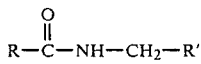

where R is an alkyl of 16 to 18 carbon atoms and R' is derived from the amine mixture. A typical synthesis is demonstrated in Example I.

As mentioned, good results have been achieved in solutions when the amine mixture is from 40% to 60% in molar excess of the acid mixture. This produces a solution wherein at reaction there is a less than stoichiometric amount of acid and therefore free amine exists in the solution. This is an economic method of neutralizing the solutions.

The present invention also is a process for protecting metals from corrosion in aqueous environment which comprises contacting the metal with an effective amount of a composition comprising the reaction product of:
1. an amine mixture comprising: a 0.8 to 1 to 1:0.8 mixture of a poly(oxyethylene)diamine of the general formula:

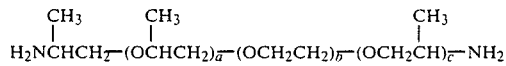

wherein b averages 13.5 and a+c averages 3.5; and a poly(oxypropylene)triamine of the general formula:

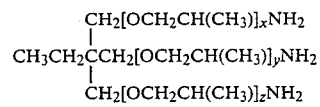

wherein x+y+z averages 5.3 and
2. an organic monomer acid mixture comprising: a 0.8 to 1 to 1 to 0.8 mixture of a petroleum wax oxidate which is a mixture of mono and dibasic acids of 4 to 25 and preferably 10 to 20 carbon atom paraffins, and a fatty acid which is a mixture of $C_{16}$ to $C_{18}$ monomer fatty acids; and
wherein the amine mixture is 40% to 60% in molar excess of the acid mixture.

In the alternative, the diamine mixture comprises: a 0.8:1 to 1:0.8 mixture of a poly(oxyethylene)diamine of the general formula:

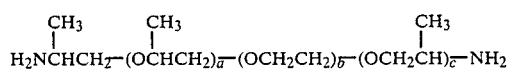

wherein b averages 13.5 and a+c averages 3.5, and an alkyl propylene diamine selected from the group consisting of:
N-coco-1,3-diaminopropane,
N-soya-1,3-diaminopropane,
N-tallow-1,3-diaminopropane, and
N-oleyl-1,3-diaminopropane.

In the process of this alternative invention, the reaction product is neutralized with an organic acid to form compositions.

The process of the present invention is particularly useful to protect petroleum pumping wells wherein metal surfaces are exposed to corrosive $CO_2$, $H_2S$ and mercaptans in a harsh aqueous-petroleum environment. Superior results are obtained when the inhibitor is added continuously to the flow line which is in fluid communication with the tubing, conveniently via chemical injection pump. The composition is a water dispersible liquid. Because of ethylene oxide-propylene oxide balance the composition displays surface activity and the active ingredients migrate to the petroleum-water interface as well as to metal surfaces where it forms a non-persistent coating. The composition in water solution has a hazy appearance and the composition will not fall out of solution as long as the solution is kept moving or agitated. The method is therefore best accomplished in a continuous process with the concentration of composition in water maintained at 10 ppm to 1,000 ppm to be most effective and preferably 25 ppm to 250 ppm for economy.

EXAMPLE

A. Inhibitor No. 1

The amine mixture was prepared by mixing a 1:1 mole ratio of JEFFAMINE ® ED-600[1)] and JEFFAMINE ® T-403[2)]. ED-600 is a poly(oxyethylene)-diamine of molecular weight 600 having the general formula:

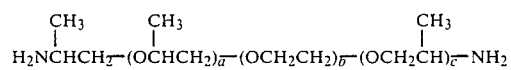

wherein b averages 13.5 and a+c averages 3.5.

T-403 is a poly(oxypropylene)triamine of molecular weight 400 having the general formula:

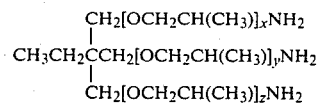

wherein x+y+z averages 5.3.

The organic monomer acid mixture was prepared by mixing a 1:1 mole ratio of Texaco TX-3650[3)] petroleum wax oxidate and Hercules WCFA[4)] monomer fatty acid. TX-3650 is made by oxidizing paraffin. The carbon number range of acid in a typical TX-3650 batch is $C_4$ to $C_{25}$ with the monomer acid predominant.

WCFA is a $C_{16}$ to $C_{18}$ monomer fatty acid mixture with an acid number of 178.

The acid and amine mixtures were added to a round bottom flask in a weight ratio of 2:5 respectively. The round bottom flask is equipped with a condenser and magnetic stirring bar. The reaction mixture is heated for 3 hours at approximately 160° C. to form an amide derivative.

The formulated inhibitor was made up by mixing the amide described above with a surfactant (in this case dicyclopentadiene sulfonate) and sufficient water and isopropyl alcohol (in a 1:1 wt. ratio) to give a solution of composition:
5 wt% dicyclopentadiene sulfonate
25 wt% amide
70 wt% alcohol-water (1:1 wt. ratio)
This mixture was warmed at 120° F. (49° C.) for 1 hour.

B. Inhibitor No. 2

Another inhibitor somewhat less soluble than Inhibitor No. 1 was made, which still provided good corrosion protection as demonstrated by test results.

The amine mixture was prepared by mixing a 1:1 mole ratio of JEFFAMINE ® ED-600 and DUOMEEN ® C[5)]. DUOMEEN ® C is a mixture of $C_{16}$ to $C_{18}$ fatty acids made by Armour Industrial Chemical Co., Chicago, Ill.

The organic monomer acid mixture was the same as used to prepare Inhibitor No. 1.

In addition, the same amounts of acids and amines and the same reaction procedure as described in Inhibitor No. 1 was employed in the synthesis of the amide component of Inhibitor No. 2.

In order to improve the water solubility of this amide product, it was further reacted (neutralized) with additional acid mixtures. The amounts of neutralizing acids used were sufficient to react with 75% of the theoretical amount of amine in the amide derivative. The theoretical amount was determined by the weight of amines used in the amide formulation and the amount of product recovered. In the case of formulation C, 1.5 gm of the amide (equivalent to 0.368 gm ED-600 or DUOMEEN ® C per gram of amide) was reacted with 0.23 gm TC-5926, 0.46 gm WAYFOS ® M-100, 0.24 gm of dicyclopentadiene sulfonate, and 2.8 gm each of water and isopropyl alcohol. This mixture was heated for 1 hour at approximately 120° F. to 130° F. (49° C. to 54° C.). Based on the above weights of materials, this inhibitor was formulated to contain:
3 wt% dicyclopentadiene sulfonate
27 wt% neutralized amide
70 wt% alcohol-water (1:1 wt. ratio)

Formulations D and E were prepared in a manner similar to that described for Formulation C.

TABLE I

| Formulation | Inhibitor No. | Neutralizing Acids | wt % Surfactant | |
|---|---|---|---|---|
| A | 1 | None | 5% | dicyclopentadienesulfonate |
| B | 1 | None | 5% | DOWFAX ® XDS 8390 |
| C | 2 | (2:1) 75% WAYFOS ® M-100/TC-5962 | 3% | dicyclopentadienesulfonate |
| D | 2 | (1:1) 75% WAYFOS ® M-100/TC-5962 | 3% | dicyclopentadienesulfonate |
| E | 2 | 75% WAYFOS ® M-100 | 3% | dicyclopentadienesulfonate |

At present, an industry established procedure for testing oil field corrosion inhibitors does not exist. Because of widely varying corrosion conditions in the oil field, it is impractical to establish any universal standard laboratory tests. But it is desirable to have tests that are easily duplicated and can approximate the continuous type of liquid and gas exposure that occurs in wells and flowlines in the oil field.

One dynamic test simulating field usage has achieved some following in the industry. The continuous exposure procedure set forth in the January 1968 issue of "Material Protections" at pages 34–35 was followed to test the subject invention. The test offers an excellent indication of the ability of organic corrosion inhibitors to protect metal emersed in either sweet or sour fluids.

GENERAL TEST PROCEDURE

The metal specimens were immersed in sweet or sour fluid environments for seventy-two (72) hours to approximate continuous exposure conditions in the oil field. The sweet fluid test environment was established by gassing the test solution with carbon dioxide. A sour fluid test environment was created by bubbling hydrogen sulfide through the test solution. The specimens were tested in both carbon dioxide and hydrogen sulfide environments. Tests were additionally run in those environments without any organic corrosion inhibitors placed in the test solutions to give a baseline for comparison purposes.

The metal test specimens were cold-rolled, mild steel coupons which measured 3 inches by 0.5 inches by 0.005 inches. These coupons were initially cleaned in order to remove any surface film, dried and then weighed.

Four ounce glass bottles were filled with two types of test solutions. The first simulated an oil-brine environment and consisted of 10 milliliters of Texaco EDM fluid, a Texaco trademarked lube oil cut having an API gravity of about 39°, 90 milliliters of a 10% synthetic brine and 1 milliliter of dilute acetic acid. The synthetic brine contained 10% sodium chloride and 0.5% calcium chloride by weight. The second test solution simulated a brine environment and was composed of 100 milliliters of the same 10% synthetic brine and 1 milliliter of acetic acid. The oil-brine and brine test solutions were then gassed for 5 to 10 minutes with carbon dioxide to create a sweet test environment or hydrogen sulfide to create a sour test environment. The solution gassing was designed to remove any dissolved oxygen as well as create the sweet or sour environment.

Next, 200 parts per million of a selected organic corrosion inhibitor were added to the gassed bottles. Each inhibitor addition was made from a standard solution of known concentration.

The steel test coupons were then placed in the bottles. The bottles were capped and mounted on the spokes of a 23 inch diameter, vertically mounted wheel and rotated for 72 hours at 30 rpm inside an oven maintained at 120° F. (40° C.). The coupons were removed from the bottles, washed and scrubbed with dilute acid for cleaning purposes, dried and weighed. The corrosion rate in mils per year (mpy) was then calculated from the weight loss. One mpy is equivalent to 0.001 inches of metal lost per year to corrosion. Additionally, the test coupons were visually inspected for the type of corrosive attack, e.g., hydrogen blistering, pitting and crevice corrosion or general corrosion.

The organic inhibitor solutions employed in the examples were comprised of about 27% organic inhibitor, about 3% dicyclopentadiene sulfonate and surfactant, and about 70% solvent. The solvent was a one to one mixture by weight of isopropyl alcohol and water.

One milliliter of the reaction mixture was diluted with 99 milliliters of isopropyl alcohol to give a concentration of 10,000 ppm in a stock solution. Finally, two milliliters of the diluted solution were added to the 100 ml test bottles for each example, leaving a final concentration of 200 ppm of inhibitor solution for each test example.

The following test results were obtained:

|             | Sweet | | Sour | |
| --- | --- | --- | --- | --- |
| Formulation | Continuous Oil-brine (mpy) | brine (mpy) | Continuous Oil-brine (mpy) | brine (mpy) |
| A | 3.1 | 2.1 | 1.7 | 3.6 |
| B | 3.4 | 1.9 | 1.4 | 4.4 |
| C | 1.7 | 3.7 | 2.5 | 8.5 |
| D | 1.4 | 4.8 | 1.4 | 7.3 |
| E | 1.7 | 1.8 | 7.8 | 5.4 |
| Blank Solution (No inhibitor) | 12.6 | 13.6 | 50.8 | 55.2 |

(1) Analyses of Typical Batches of JEFFAMINE ® ED-600

| | |
| --- | --- |
| Total Amine, wt. % | 97.5 |
| Primary Amine, wt. % | 95.9 |
| Total Acetylatables, meq./g. | 3.27 |
| Color, Pt—Co | 40 |
| Water, Wt. % | 0.1 |
| Specific Gravity | 1.0454, 20° C./20° C. |
| | 1.0293, 50° C./20° C. |
| | 0.9905, 210° F./20° C. |
| Flash Point, °F. | 495 |
| Pour Point, °F. | 20 |
| Freezing Point, °C. | — |
| Viscosity, cs | 70, 20° C. |
| | 20, 50° C. |
| | 6.7, 210° F. |

(2) Typical Physical Properties of JEFFAMINE ® T-403

| | |
| --- | --- |
| Color, Pt—Co | 10 |
| Viscosity, CS, 25° C. | 76.5 |
| 20° C. | 97 |
| Specific gravity, 20/20° C. | 0.9812 |
| Refractive index, $n_D^{20}$ | 1.4606 |
| Flash point, COC, °F. | 380 |
| Water, wt % | 0.08 |
| Total acetylatables, meq/g | 6.75 |
| Total amine, meq/g | 6.45 |
| Primary amine, meq/g | 6.16 |
| Vapor pressure, mm Hg/°C. | 1/181, 5/207 |
| pH, 1% aq. solution | 11.2 |
| 5% aq. solution | 11.6 |

(3) Properties of Texaco TX-3650 and TC-5926

| | TX-3650 | TC-5926 |
| --- | --- | --- |
| Neut. No. | 225 | 160 |
| Sap No. | 420 | 310 |
| Lbs/gal @ 60° F. | 9.0 | 8.9 |
| M.P., °F. | 70 | — |
| Pour, °F. | — | 30 |
| Vis. @ 210° F. SUS | 160 | 116 |
| Flash, °F. | 445 | 275 |
| Unsap., wt % | 6 | 15 |
| Dibasic Acid, wt % | 12 | |
| M.W. (approx.) | 400 | 350 |

TX-3650 and TC-5926 are complex mixtures composed primarily or organic acids and esters but also containing alcohols, ketones, hydroxy and keto acids, estolides, lactides and lactones.

(4) WCFA is a product of Hercules Chemical Company $C_{16}$–$C_{18}$ monomer fatty acid of acid #178.

Typical Analysis 81 wt % monomer fatty acids
11 wt % resin acids (cyclic molecules)
8 wt % unsaponifiables (non acid)

(5) Typical Properties of DUOMEEN ® C

Physical Properties

| | |
| --- | --- |
| Physical Form @ 25° C. | Liquid |
| Approximate Melting Range, °F. | 54–59 |
| Specific Gravity @ 40/25° C. | 0.836 |
| Specific Gravity @ 60/25° C. | 0.810 |
| Specific Gravity @ 70/25° C. | 0.803 |
| Specific Gravity @ 80/25° C. | 0.796 |
| Viscosity @ 25° C., cp | 10 |
| Viscosity @ 30° C., cp | — |
| Viscosity @ 35° C., cp | — |
| Typical molecular weight | 276 |
| Flash Point, °F., COC | 295 |

Batch Specification

| | |
| --- | --- |
| Chemical Name | N—coco-1,3-diaminopropane |
| Iodine Value | 15 max |
| Apparent Diamine Activity, % | 89 min |
| Primary Amine, % | 43 min |
| Secondary Amine, % | 43 min |
| Color, Gardner | 12 max |
| Moisture, % | 1 max |
| Combining Weight | 145 max |
| Amine Number | 387 min |

(6) Typical Properties of WAYFOS ® M-100

| | |
| --- | --- |
| Hydrocarbon Group | Branched nonyl phenol |
| Av. No. of Ethylene Oxide Groups | 10 |
| Percent Phosphorus | 4.0–4.3 |
| Percent Monoester | 50–60 |
| Percent Diester | 30–40 |
| Percent Unreacted Nonionic | 0–10 |
| Percent Phosphoric Acid | 2–4 |

Acidity per gram of WAYFOS ®

| | |
| --- | --- |
| Milliequivalents of base to pH 5.5 | 1.2–1.4 |
| Milliequivalents of base to pH 9.5 | 2.3–2.5 |

WAYFOS ® M-100 is an organic phosphate surfactant manufactured by the Philip A. Hunt Chemical Corporation, Organic Chemical Division. It is produced by the controlled phosphorylation of ethoxylated aliphatic alcohols and alkyl phenols to yield a mixture of mono and diesters of orthophosphoric acid. The chemical structures of these esters are shown below:

$$R(OCH_2CH_2)_n-OP\begin{matrix}O\\ \|\\ \end{matrix}\begin{matrix}OH\\ /\\ \backslash OH\end{matrix} \qquad [R(OCH_2CH_2)_nO]_2P\begin{matrix}O\\ \|\\ \end{matrix}-OH$$

Monoester $\qquad$ Diester

Where R = alkyl phenol or aliphatic group
n = 1 to 20 (average of 10)

(7) DOWFAX ® XDS 8390 surfactant

-continued

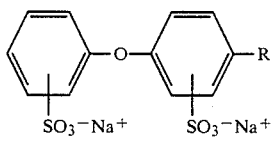

where R is a linear $C_{16}$ hydrophobe.

Typical Properties of DOWFAX ® XDS 8390

| | |
|---|---|
| Appearance | Clear, amber liquid |
| Hydrophobe Source | $C_{18}$ alpha-olefin |
| Average Molecular Weight | 632 |
| Active Ingredient, min | 35% |
| Density, g/cc @ 25° C. | 1.11 |
| Viscosity, cps @ 25° C. | 10 |
| Surface Tension, dynes/cm | |
| Concentration in Water | |
| 0.01% | 50 |
| 0.1 | 45 |
| 1.0 | 44 |
| Ross-Miles Foam Height | |
| 1.0% @ 25° C. | |
| Initial, mm | 155 |
| 5 minutes, mm | 57 |
| Solubility @ 25° C. | |
| Mineral Oil | insoluble |
| Xylene | insoluble |
| Perchloroethylene | insoluble |
| Ethanol | soluble |
| Water | soluble |
| 25% Caustic | soluble |
| 20% HCl | soluble |
| 35% Tetrapotassium Pyrophosphate | soluble |

The principle of the invention and the best mode contemplated for applying the principle have been described. It is to be understood that the foregoing is illustrative only and that other means and techniques can be employed without departing from the true scope of the invention defined in the following claims:

What is claimed is:

1. A corrosion inhibition solution comprising:
   A. water, and
   B. 10 ppm to 1,000 ppm of a composition comprising the reaction product of:
      1. an amine mixture comprising:
         a 0.8:1 to 1:0.8 mixture of a poly(oxyethylene)-diamine of molecular weight from 500 to 700 and a poly(oxypropylene)triamine of molecular weight from 300 to 500, and
      2. an organic monomer acid mixture comprising:
         a 0.8:1 to 1:0.8 mixture of a petroleum wax oxidate and a fatty acid.

2. The solution of claim 1 which additionally comprises brine.

3. The solution of claim 1 which comprises from 25 ppm to 250 ppm of the reaction product.

4. The solution of claim 1 wherein in the composition the amine mixture is from 40% to 60% in molar excess of the acid mixture.

5. The solution of claim 1 wherein in the amine mixture the poly(oxyethylene)diamine is of the general formula:

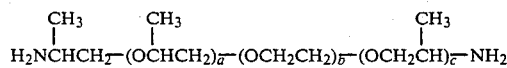

wherein b averages 13.5 and a+c averages 3.5 and wherein the poly(oxypropylene)triamine is of the general formula:

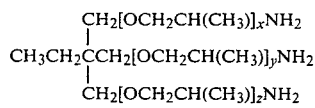

wherein x+y+z averages 5.3.

6. The solution of claim 1 wherein in the organic monomer acid mixture the petroleum wax oxidate is a mixture of mono carboxylic acids of 4 to 25 carbon atom paraffins and wherein the fatty acid is a mixture of $C_{16}$ to $C_{18}$ monomer fatty acids.

7. The solution of claim 1 which additionally comprises a surfactant.

8. A process of protecting metals from corrosion in aqueous environment which comprises contacting the metal with an effective amount of a composition comprising the reaction product of:
   1. an amine mixture comprising:
      a 0.8:1 to 1:0.8 mixture of a poly(oxyethylene)diamine of the general formula:

wherein b averages 13.5 and a+c averages 3.5, and a poly(oxypropylene)triamine of the general formula:

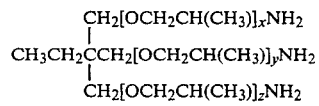

2. an organic monomer acid mixture comprising:
      a 0.8:1 to 1:0.8 mixture of a petroleum wax oxidate which is a mixture of mono carboxylic acids of 4 to 25 carbon atom paraffins, and a fatty acid which is a mixture of $C_{16}$ to $C_{18}$ monomer fatty acids; and wherein the amine mixture is 40% to 60% in molar excess of the acid mixture.

9. The process of claim 8 where contacting is accomplished in a continuous process.

10. A corrosion inhibition solution comprising:
    A. water, and
    B. 10 ppm to 1,000 ppm of a composition comprising the neutralized reaction product of:
       1. an amine mixture comprising:
          a 0.8:1 to 1:0.8 mixture of a poly(oxyethylene)-diamine of molecular weight from 500 to 700 and an alkyl propylene diamine selected from the group consisting of
          N-coco-1,3-diaminopropane,
          N-soya-1,3-diaminopropane,
          N-tallow-1,3-diaminopropane, and
          N-oleyl-1,3-diaminopropane; and
       2. an organic monomer acid mixture comprising a 0.8:1 to 1:0.8 mixture of a petroleum wax oxidate and a fatty acid.

11. The solution of claim 10 which additionally comprises brine.

12. The solution of claim 10 which comprises from 25 ppm to 250 ppm of the reaction product.

13. The solution of claim 10 wherein in the composition the amine mixture is from 40% to 60% in molar excess of the acid mixture.

14. The solution of claim 10 wherein in the amine mixture the poly(oxyethylene)diamine is of the general formula:

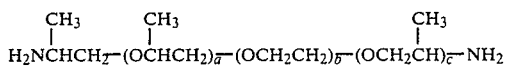

wherein b averages 13.5 and a+c averages 3.5 and wherein the poly(oxypropylene)triamine is of the general formula:

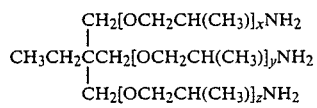

wherein x+y+z averages 5.3.

15. The solution of claim 10 wherein in the amine mixture the alkyl propylene diamine is N-coco-1,3-diaminopropane.

16. The solution of claim 10 wherein in the organic monomer acid mixture the petroleum wax oxidate is a mixture of mono carboxylic acids of 4 to 25 carbon atom paraffins and wherein the fatty acids is a mixture of $C_{16}$ to $C_{18}$ monomer fatty acids.

17. The solution of claim 10 which additionally comprises a surfactant.

18. A process of protecting metals from corrosion in aqueous environment which comprises contacting the metal with an effective amount of a composition comprising the neutralized reaction product of:
 1. an amine mixture comprising:
  a 0.8:1 to 1:0.8 mixture of a poly(oxyethylene)diamine of the general formula:

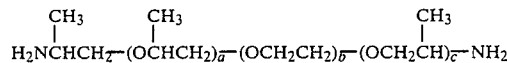

wherein b averages 13.5 and a+c averages 3.5, and an alkyl propylene diamine selected from the group consisting of
  N-coco-1,3-diaminopropane,
  N-soya-1,3-diaminopropane,
  N-tallow-1,3-diaminopropane, and
  N-oleyl-1,3-diaminopropane; and
 2. an organic monomer acid mixture comprising a 0.8:1 to 1:0.8 mixture of a petroleum wax oxidate which is a mixture consisting of mono carboxylic acids of 4 to 25 carbon atom paraffins, and a fatty acid which is a mixture of $C_{16}$ to $C_{18}$ monomer fatty acids; and wherein the amine mixture is 40% to 60% in molar excess of the acid mixture.

* * * * *

UNITED STATES PATENT AND TRADEMARK OFFICE
CERTIFICATE OF CORRECTION

PATENT NO. : 4,499,006

DATED : February 12, 1985

INVENTOR(S) : Frederick William Valone and Joseph Rutledge

It is certified that error appears in the above-identified patent and that said Letters Patent is hereby corrected as shown below:

On the title page of the Formal Patent Document, left column after "Rutledge, both of Houston, Texas" insert --Assignee: Texaco Inc., White Plains, NY--.

Signed and Sealed this

Eighteenth Day of June 1985

[SEAL]

Attest:

DONALD J. QUIGG

Attesting Officer     Acting Commissioner of Patents and Trademarks